(12) United States Patent
ten Broeke et al.

(10) Patent No.: US 10,302,167 B2
(45) Date of Patent: May 28, 2019

(54) PISTON DESIGN WITH INCREASED LATERAL STRENGTH

(71) Applicant: Firestone Industrial Products Company, LLC, Indianapolis, IN (US)

(72) Inventors: Edger ten Broeke, Sinderen (NL); Machiel G. A. Wentink, Velp (NL)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 0 days.

(21) Appl. No.: 15/611,463

(22) Filed: Jun. 1, 2017

(65) Prior Publication Data

US 2017/0268592 A1 Sep. 21, 2017

Related U.S. Application Data

(63) Continuation of application No. PCT/US2015/063916, filed on Dec. 4, 2015.

(60) Provisional application No. 62/087,462, filed on Dec. 4, 2014.

(51) Int. Cl.
| | |
|---|---|
| *F16F 9/05* | (2006.01) |
| *B60G 11/27* | (2006.01) |
| *F16F 9/32* | (2006.01) |

(52) U.S. Cl.
CPC .............. *F16F 9/057* (2013.01); *B60G 11/27* (2013.01); *F16F 9/05* (2013.01); *F16F 9/3214* (2013.01); *B60G 2202/152* (2013.01); *B60G 2206/424* (2013.01)

(58) Field of Classification Search
CPC . F16F 9/05; F16F 9/057; F16F 9/3214; B60G 11/27; B60G 2202/152; B60G 2206/424; B60G 2204/126

USPC ................................................... 267/64.27
See application file for complete search history.

(56) References Cited

U.S. PATENT DOCUMENTS

| | | | | |
|---|---|---|---|---|
| 5,535,994 A | * | 7/1996 | Safreed, Jr. ............ | B60G 11/28 267/122 |
| 6,024,343 A | * | 2/2000 | Ebert ..................... | B60G 11/28 267/124 |
| 6,234,460 B1 | * | 5/2001 | Arnold ................... | B60G 11/28 267/122 |

(Continued)

OTHER PUBLICATIONS

International Search Report and Written Opinion of the International Searching Authority dated Mar. 21, 2016 for International Application No. PCT/US2015/063916 (12 pages).

(Continued)

*Primary Examiner* — Thomas W Irvin
(74) *Attorney, Agent, or Firm* — Taylor IP, P.C.

(57) ABSTRACT

A molded piston for an air spring for a vehicle suspension has an outer shell, a non-cylindrical central column braced in its relation to the outer shell by outer radial webs, and an upper surface having a recessed lower end closure seating surface. The non-cylindrical central column may have a chordal surface and a mounting stud sleeve and hole for attachment to a vehicle suspension member. The mounting stud sleeve and hole may be braced in its relation to the non-cylindrical central column by inner radial webs. The non-cylindrical central column may further have a locating sleeve and hole. The outer radial webs may be provided with Y-shaped webs connecting the outer radial webs to the outer shell and/or web arches.

16 Claims, 9 Drawing Sheets

(56) References Cited

U.S. PATENT DOCUMENTS

| | | | | |
|---|---|---|---|---|
| 6,250,613 B1* | 6/2001 | Koeske | ............... | B60G 11/28 |
| | | | | 267/122 |
| 6,386,524 B1* | 5/2002 | Levy | ............... | B60G 11/28 |
| | | | | 267/64.21 |
| 6,527,259 B1* | 3/2003 | Nemeth | ............... | F16F 9/057 |
| | | | | 267/64.21 |
| 7,500,659 B2* | 3/2009 | Levy | ............... | B60G 11/28 |
| | | | | 267/64.21 |
| 8,061,691 B2* | 11/2011 | Levy | ............... | B60G 11/28 |
| | | | | 267/64.21 |
| 8,231,113 B2* | 7/2012 | Grabarz | ............... | B60G 11/27 |
| | | | | 267/122 |
| 9,261,157 B2* | 2/2016 | Leonard | ............... | B60G 11/27 |
| 9,334,916 B2* | 5/2016 | Neitzel | ............... | B60G 11/27 |
| 9,738,131 B2* | 8/2017 | Keeler | ............... | B60G 15/12 |
| 2006/0226586 A1 | 10/2006 | Levy | | |
| 2008/0211150 A1 | 9/2008 | Levy et al. | | |
| 2009/0179359 A1 | 7/2009 | Leonard | | |
| 2009/0200717 A1 | 8/2009 | Rebernik et al. | | |
| 2010/0127438 A1* | 5/2010 | Eise | ............... | F16F 9/057 |
| | | | | 267/124 |

OTHER PUBLICATIONS

Notification Concerning Transmittal of International Preliminary Report on Patentability dated Jun. 15, 2017 for International Application No. PCT/US2015/063916 (12 pages).

\* cited by examiner

PISTON DESIGN WITH INCREASED LATERAL STRENGTH

CROSS REFERENCE TO RELATED APPLICATIONS

This is a continuation of PCT application No. PCT/US2015/063916, entitled "PISTON DESIGN WITH INCREASED LATERAL STRENGTH", filed Dec. 4, 2015, which claims priority to U.S. provisional patent application Ser. No. 62/087,462, entitled "PISTON DESIGN WITH INCREASED LATERAL STRENGTH", filed Dec. 4, 2014, which are each incorporated herein by reference.

BACKGROUND OF THE INVENTION

1. Field of the Invention

The present invention relates to air spring systems, and, more particularly, to pistons used in rolling lobe air springs.

2. Description of the Related Art

Air spring systems are commonly used in vehicle suspensions, truck cab mountings, and seat suspensions, particularly in heavy vehicles such as over the road trucks and tractors. Such air spring systems typically have large load carrying capacity while retaining excellent isolation of the vehicle or its suspended components from road vibration and harshness due to the compressibility of the air within the air springs.

Construction of air springs for use in air spring systems typically involves the use of a top bead plate, a flexible sleeve, and a lower piston. The flexible sleeve is typically attached to the top bead plate by way of an integrally formed upper mounting bead formed into the flexible sleeve which is then crimped onto the top bead plate. The lower end of the flexible sleeve is also provided with an integrally formed mounting bead, which is captured between the upper surface of the lower piston and a lower end closure. The top bead plate, the flexible sleeve, and the lower end closure together define a spring chamber, which changes in volume as the lower piston articulates, causing the flexible sleeve to roll over itself forming a rolling lobe.

The lower piston of the air spring is often provided with a mounting stud that extends through the piston, the aforementioned lower end closure, and through a vehicle suspension member, such as a trailing arm. The top bead plate is usually attached to some other part of the vehicle structure, such as a mount attached to the vehicle frame. In this way, the air spring provides support of the vehicle mass and load via the frame, suspension, and axles, while providing the necessary isolation from road vibration and harshness.

Pistons for use in such air springs are typically of either formed steel construction, or are molded from plastic. The formed steel variety are usually constructed of deep drawn stampings, often including an outer shell, a base plate, and some inner structure, such as a center column. The molded variety, with which this disclosure is concerned, generally have an outer shell portion, a circular central column, radial webs connecting the outer shell portion and the circular central column, and an upper surface having a recessed upper seating surface configured to receive the lower end closure and the lower bead of the flexible sleeve.

What is needed in the art is way to improve the lateral stiffness and overall strength of the pistons used in air springs, while decreasing overall weight of the pistons and allowing for improved manufacturing by the minimization of manufacturability features such as draft angles.

SUMMARY OF THE INVENTION

Embodiments of the present invention provide such a piston for use in air springs, the piston having improved lateral stiffness and overall strength. These embodiments of pistons according to the present invention provided herein may be optimized for minimum weight and/or improved manufacturing by minimization of manufacturability features such as draft angles. Embodiments of the present invention may utilize an outer shell portion and a non-circular central column for support and attachment to a vehicle suspension component. The non-circular central column may include a chordal surface to assist in providing lateral stiffness and strength where the piston is subjected to asymmetrical forces. Attachment to the vehicle suspension component may be by way of a mounting stud sleeve and hole, which may use one or more threaded inserts. A single stud may be used, passing entirely through the mounting stud sleeve and hole, or separate fasteners may be used. Further attachment to and alignment with the vehicle suspension component may be by way of a locating sleeve and hole, which may also use a threaded insert. The threaded inserts of the mounting stud sleeve and hole, if used, and of the locating sleeve and hole may be molded-in and/or may interface with their respective sleeve and hole by way of splines or other features designed to prevent rotation or dislocation of the threaded insert. The spline of the mounting stud sleeve and hole may be formed so that the grooves of the spline taper inwards, while the inner surfaces of the spline remain at a fixed radius, such that the spline decreases in depth along its length. This allows for positive location of the mounting stud along the full length of the mounting stud sleeve and hole, while providing sufficient draft for removal of the tooling used to form the piston.

The central column may be braced in its relation to the outer shell portion by outer radial webs, which may be provided with web arches and/or Y-shaped webs. The mounting stud sleeve and hole may be braced in its relation to the central column by inner radial webs. The chambers defined by the mounting stud sleeve and hole, the central column, and the inner radial webs may extend through the upper surface of the piston to minimize weight, or may be blind. The Y-shaped webs, when used, may be in an orthogonal arrangement, or may be separated by an acute angle.

The invention in one form is directed to an air spring for a vehicle suspension having a top bead plate, a flexible sleeve, a lower end closure, and a molded piston. The molded piston has an outer shell, a non-cylindrical central column braced in its relation to the outer shell by outer radial webs, and an upper surface.

The invention in another form is directed to a molded piston for an air spring for a vehicle suspension. The molded piston has an outer shell, a non-cylindrical central column braced in its relation to the outer shell by outer radial webs, and an upper surface having a recessed lower end closure seating surface.

One advantage of the present invention is that it provides improved lateral stiffness and overall strength in a piston for an air spring, while optimizing its construction for minimum weight and improved manufacturability. Another advantage is that the piston better tolerates asymmetrical loading forces. Manufacturing and cost efficiencies may further be maximized by the use of molded-in or inserted threaded inserts.

Additional features and advantages of the invention will be made apparent from the following detailed description of illustrative embodiments that proceeds with reference to the accompanying drawings.

BRIEF DESCRIPTION OF THE DRAWINGS

The above-mentioned and other features and advantages of this disclosure, and the manner of attaining them, will become more apparent and the disclosure will be better understood by reference to the following description of an embodiment of the disclosure taken in conjunction with the accompanying drawings, wherein.

Corresponding reference characters indicate corresponding parts throughout the several views. The exemplification set out herein illustrates embodiments of the disclosure, and such exemplifications are not to be construed as limiting the scope of the disclosure in any manner.

DETAILED DESCRIPTION OF THE INVENTION

Figure 1:
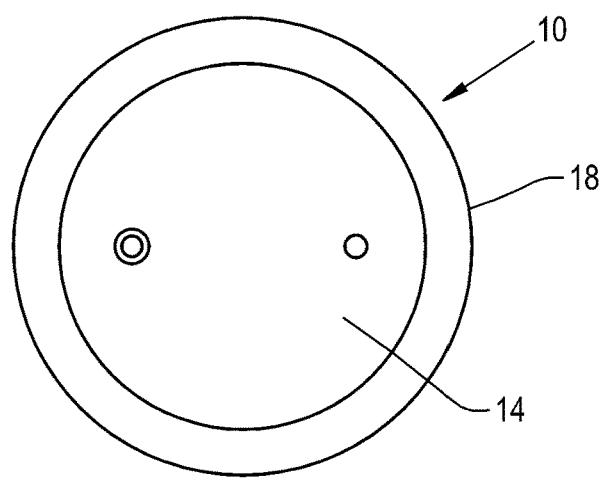
FIG. 1 is a top view of an air spring according to an embodiment of the present invention.
Figure 2:
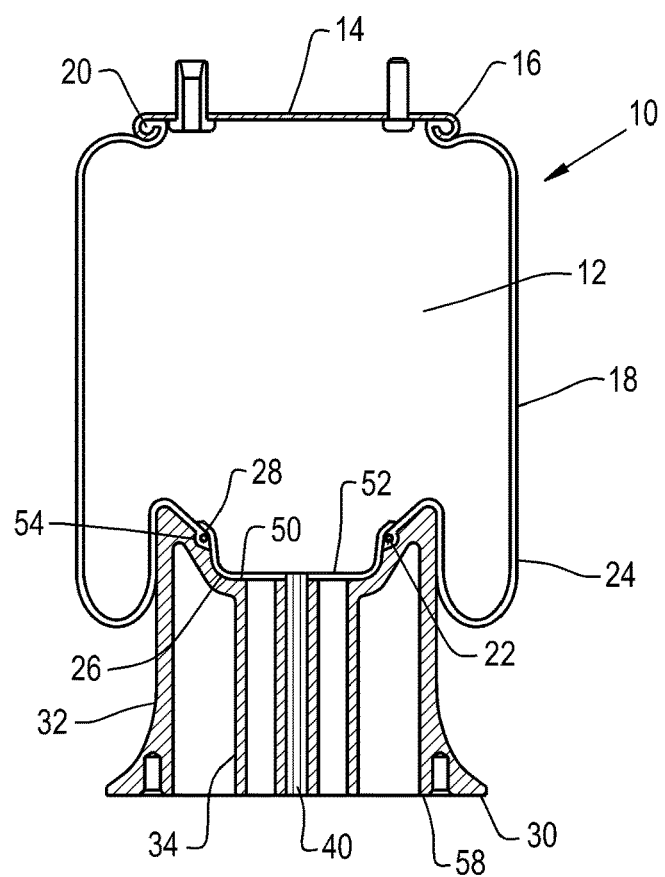
FIG. 2 is a cross-sectional view of an air spring according to an embodiment of the present invention.

Referring now to the drawings, and more particularly to FIGS. 1 and 2, there is shown an embodiment of an air spring 10 of the present invention. The air spring 10 has a flexible sleeve 18 attached to a top bead plate 14 by means of an integrally formed upper mounting bead 20 which is affixed to the top bead plate 14 by means of a crimp 16. The flexible sleeve 18 is further attached to a lower end closure 26 by means of an integrally formed lower mounting bead 22. The top bead plate 14, the flexible sleeve 18, and the lower end closure 26 together define a spring chamber 12. A molded piston 30 partially penetrates into the area of the spring chamber 12, whereby the flexible sleeve 18 folds in upon itself, forming a rolling lobe 24. As this happens, the area defined by the spring chamber 12 gets smaller, compressing the pressurized air therein, and providing a progressive restorative force, so that the air spring 10 provides the necessary load bearing capability while isolating the vehicle or its suspended components from road vibration and harshness.

The molded piston 30 itself is possessed of an outer shell portion 32 and a central column 34 for support. The upper surface 50 of the molded piston 30 has a recessed lower end closure seating surface 52, which receives and centers the lower end closure 26. A seating surface mounting recess 54 cooperates with a lower end closure mounting bead recess 28 formed into the lower end closure 26 to securely affix the integrally formed lower mounting bead 22 of the flexible sleeve 18. The central column 34 has a mounting stud sleeve and hole 40, which extends from the recessed lower end closure seating surface 52 to the lower surface 58 of the molded piston 30.

Figure 3:
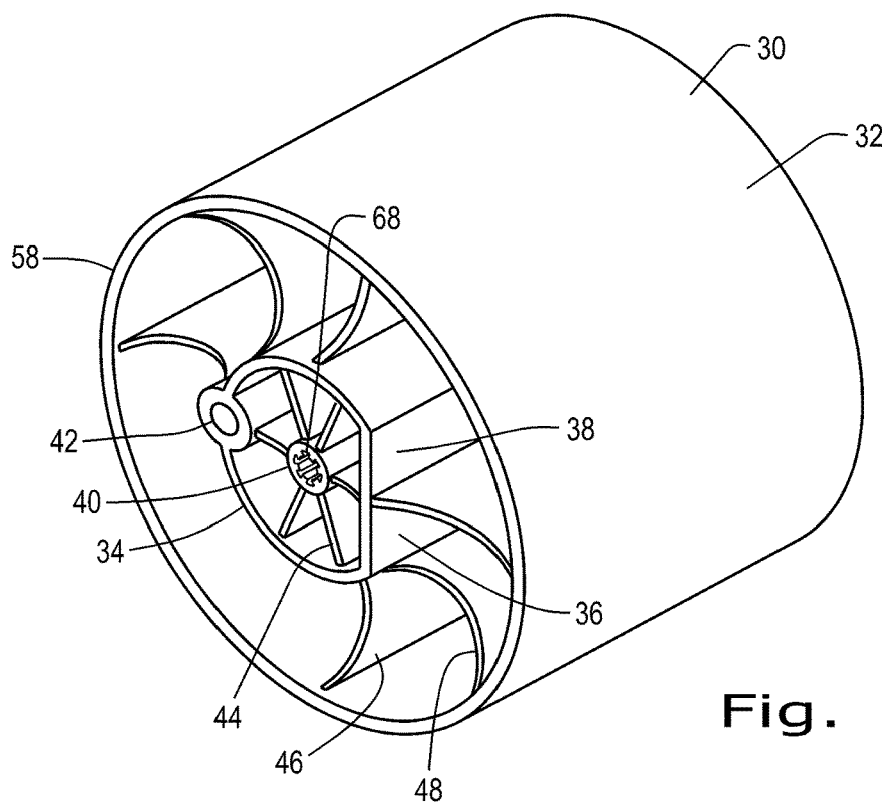
FIG. 3 is an isometric view of a molded piston of an air spring according to an embodiment of the present invention.
Figure 4:
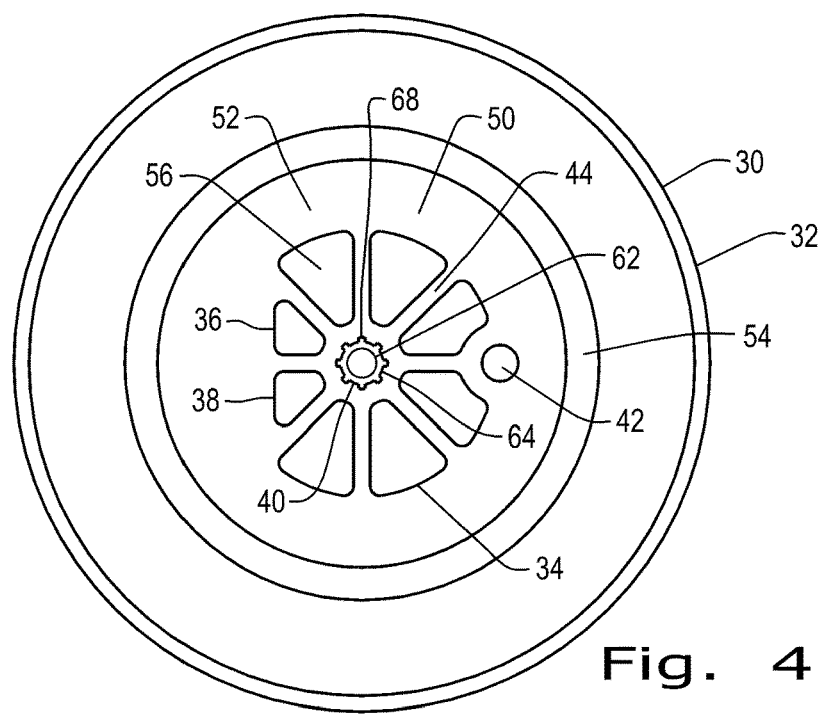
FIG. 4 is a top view of a molded piston of an air spring according to an embodiment of the present invention.
Figure 5:
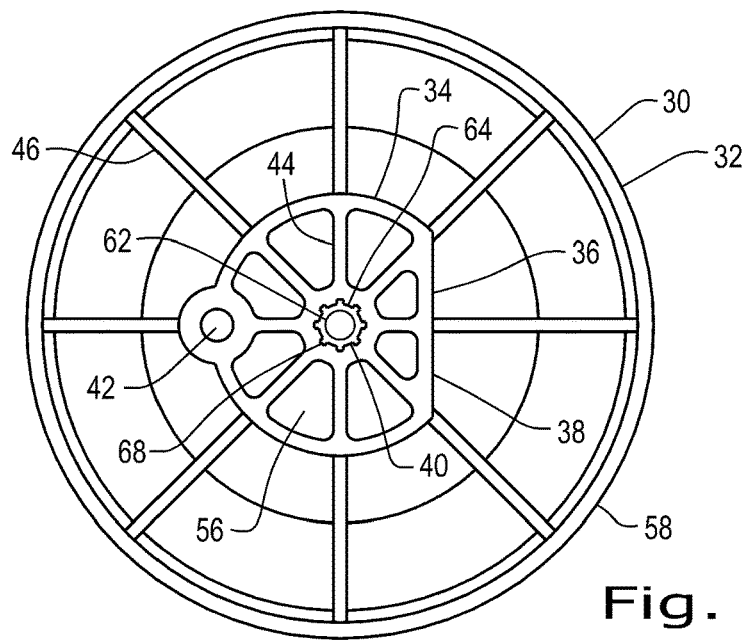
FIG. 5 is a bottom view of a molded piston of an air spring according to an embodiment of the present invention.

Turning now to FIGS. 3 through 5, there is shown an embodiment of a molded piston 30 of the present invention. The molded piston 30 is again possessed of an outer shell portion 32 and a central column 34 for support. The central column 34 is braced in its relation to the outer shell portion 32 by outer radial webs 46, which may be provided with web arches 48 for weight saving purposes. The central column 34 is further provided with a non-cylindrical portion 36, which may take the form of a chordal surface 38. The non-cylindrical portion 36 assists in providing lateral stiffness and strength, particularly where such molded piston 30 of the air spring 10 is subjected to asymmetrical forces, while minimizing draft angle requirements associated with known molding techniques.

A mounting stud sleeve and hole 40 and a locating sleeve and hole 42 extends from the upper surface 50 to the lower surface 58. The mounting stud sleeve and hole 40 is provided with a spline 68, which may be used to provide positive location to the mounting stud (not shown), while allowing for sufficient draft to remove the tooling used to form the molded piston 30, as will be shown. The mounting stud sleeve and hole 40 is braced in its relation to the central column 34 by inner radial webs 44. The upper surface 50 is again provided with a recessed lower end closure seating surface 52 having a seating surface mounting bead recess 54, which cooperates with a lower end closure mounting bead recess 28 (not shown in FIGS. 3 through 5) formed into the lower end closure 26 (also not shown in FIGS. 3 through 5) to securely affix the integrally formed lower mounting bead 22 of the flexible sleeve 18 (also not shown in FIGS. 3 through 5).

The interior of the central column 34, the exterior of the mounting stud sleeve and hole 40, and the inner radial webs 44 together define chambers which extend from the lower surface 58 to openings 56 in the recessed lower end closure seating surface 52. These lower end closure seating surface openings 56 further facilitate manufacturability of the molded piston 30, while providing for lightweight construction.

While the air spring 10 of the present invention may utilize a mounting stud (not shown) extending through a vehicle suspension member (not shown), through the mounting stud sleeve and hole 40 of the molded piston 30, and through the lower end closure 26, it is also envisioned to utilize separate fasteners to attach the lower end closure 26 to the molded piston 30, and to attach the molded piston 30 to the vehicle suspension member (not shown). In this embodiment, or in the embodiment utilizing a single mounting stud, a central thread 62 may be provided to engage the separate fasteners or the single mounting stud. This central thread 62 may take the form of a threaded insert 64 molded into or otherwise attached to the interior of the sleeve and hole 40 of the molded piston 30. Furthermore, this central thread may preferably be a M12 ISO metric screw thread, such as M12-1.75, M12-1.5, or M12-1.25, or similar. A similar thread or threaded insert (not shown) may be provided in the locating sleeve and hole 42.

Figure 6:
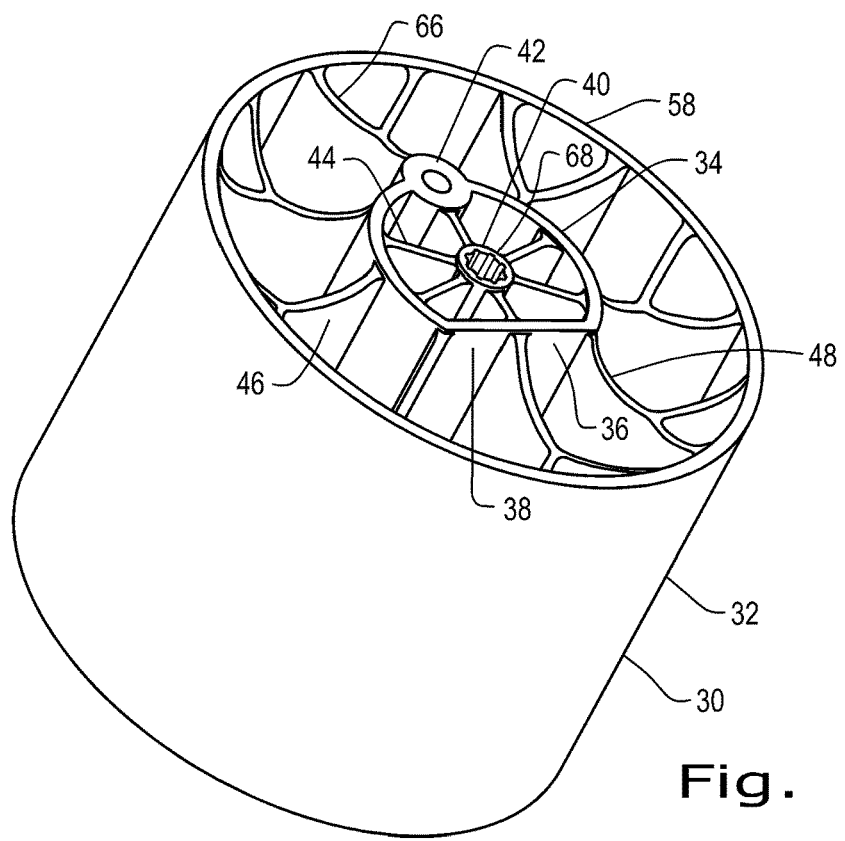
FIG. 6 is an isometric view of a molded piston of an air spring according to an embodiment of the present invention.
Figure 7:
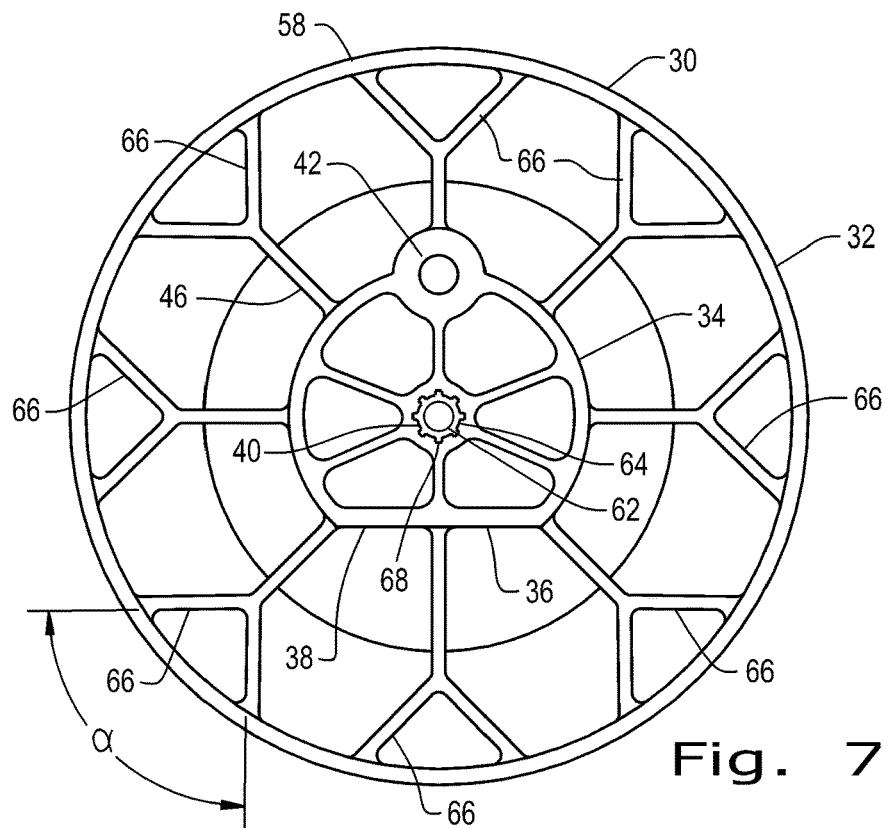
FIG. 7 is a bottom view of a molded piston of an air spring according to an embodiment of the present invention.

Turning now to FIGS. 6 and 7, there is shown another embodiment of a molded piston 30 of the present invention. The molded piston 30 is again possessed of an outer shell portion 32, a central column 34, outer radial webs 46, inner radial webs 44, and lower surface 58. A non-cylindrical portion 36 of central column 34 again takes the form of a chordal surface 38. The central column 34 again possesses a mounting stud sleeve and hole 40 and a locating sleeve and hole 42. The mounting stud sleeve and hole 40 is again provided with a spline 68, which may be used to provide positive location to the mounting stud (not shown), while allowing for sufficient draft to remove the tooling used to form the molded piston 30, as will be shown. The mounting sleeve and hole 40 may or may not be provided with a central thread 62, which may take the form of a threaded insert 64. The threaded insert 64 may interface with the mounting sleeve and hole 40 by way of the spline 68, or may otherwise be molded into the molded piston 30. The molded piston 30 as embodied in FIGS. 6 and 7 differs, however, from the molded piston 30 embodied in FIGS. 3 through 5 in that outer radial webs 46, in addition to having web arches 48, have Y shaped webs 66. Y shaped webs 66 provide additional stiffness to molded piston 30. Y shaped webs 66 as shown in FIGS. 6 and 7 are oriented orthogonally, such that the Y shaped webs describe an angle α of approximately 90 degrees. Further, in the embodiment shown in FIG. 6, no openings 56 are provided in the recessed lower end closure seating surface 52.

Turning now to FIGS. 8 through 11, there is shown another embodiment of a molded piston 30 of the present invention. The molded piston 30 is again possessed of an outer shell portion 32, a central column 34, outer radial webs 46, inner radial webs 44, and lower surface 58. A non-cylindrical portion 36 of central column 34 again takes the form of a chordal surface 38. The central column 34 again possesses a mounting stud sleeve and hole 40 and a locating sleeve and hole 42. The mounting stud sleeve and hole 40 is again provided with a spline 68, which may be used to provide positive location to the mounting stud (not shown), while allowing for sufficient draft to remove the tooling used to form the molded piston 30, as will be shown. The mounting sleeve and hole 40 again may or may not have a central thread 62, which may take the form of a threaded insert 64. The threaded insert 64 may again interface with the mounting sleeve and hole 40 by way of the spline 68, or may otherwise be molded into the molded piston 30. The locating sleeve and hole 42 is similarly provided with a threaded insert 70. The molded piston 30 as embodied in FIGS. 8 through 11 differs from the molded piston 30 embodied in FIGS. 6 and 7 in that outer radial webs 46 have Y shaped webs 66 without web arches 48. Further, the Y shaped webs 66 shown in FIGS. 8 through 11 differ from those shown in FIGS. 6 and 7 in that they describe an acute angle α. The interior of the central column 34, the exterior of the mounting stud sleeve and hole 40, and the inner radial webs 44 again define chambers which extend from the lower surface 58 to openings 56 in the recessed lower end closure seating surface 52.

Figure 12:
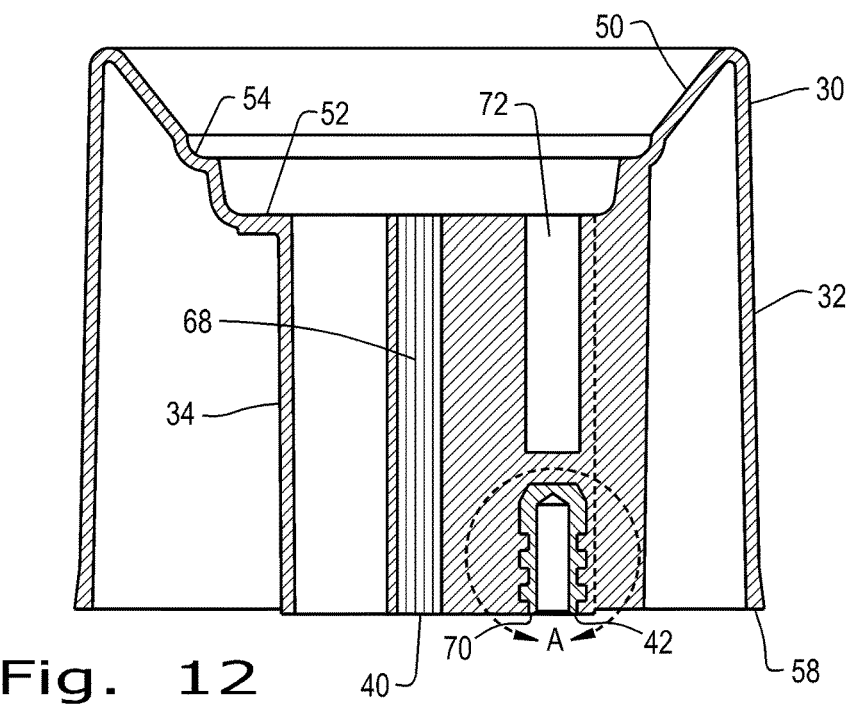
FIG. 12 is a cross-sectional view of a molded piston of an air spring according to an embodiment of the present invention.

FIG. 12 shows a cross-sectional view of the molded piston 30, again having an upper surface 50, a lower surface 58, an outer shell portion 32, and a central column 34. The upper surface 50 of the molded piston 30 is again provided with a recessed lower end closure seating surface 52 having a seating surface mounting bead recess 54. The central column 34 again has a mounting stud sleeve and hole 40 and a locating sleeve and hole 42. In lieu of the locating sleeve and hole 42 extending through to the recessed lower end closure seating surface 52, a blind cavity 72 extends towards the locating sleeve and hole 42 from the recessed lower end closure seating surface 52. Spline 68 is clearly shown within the mounting stud sleeve and hole 40. Locating sleeve and hole 42 is provided with a threaded insert 70, which is shown molded into the central column 34 of the molded piston 30.

Figure 8:
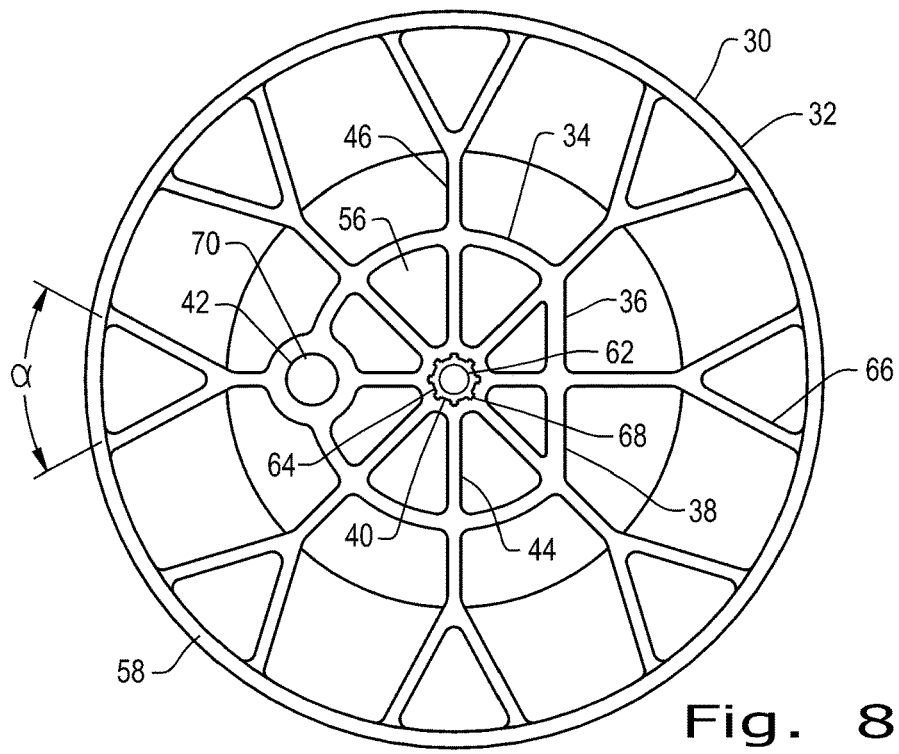
FIG. 8 is a bottom view of a molded piston of an air spring according to an embodiment of the present invention.
Figure 9:
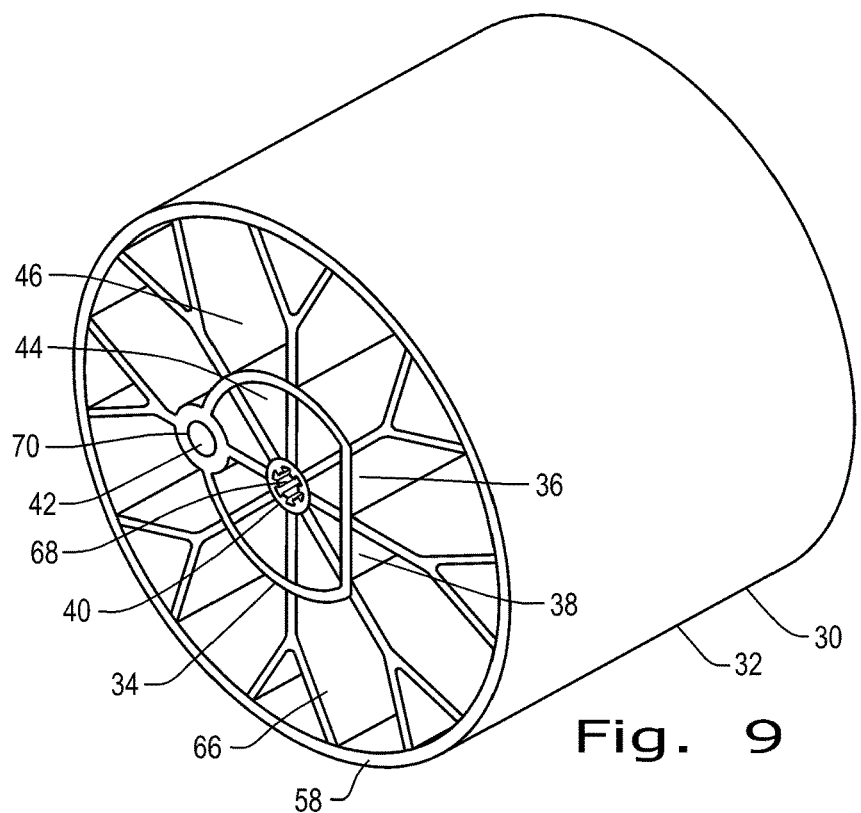
FIG. 9 is an isometric view of a molded piston of an air spring according to an embodiment of the present invention.
Figure 10:
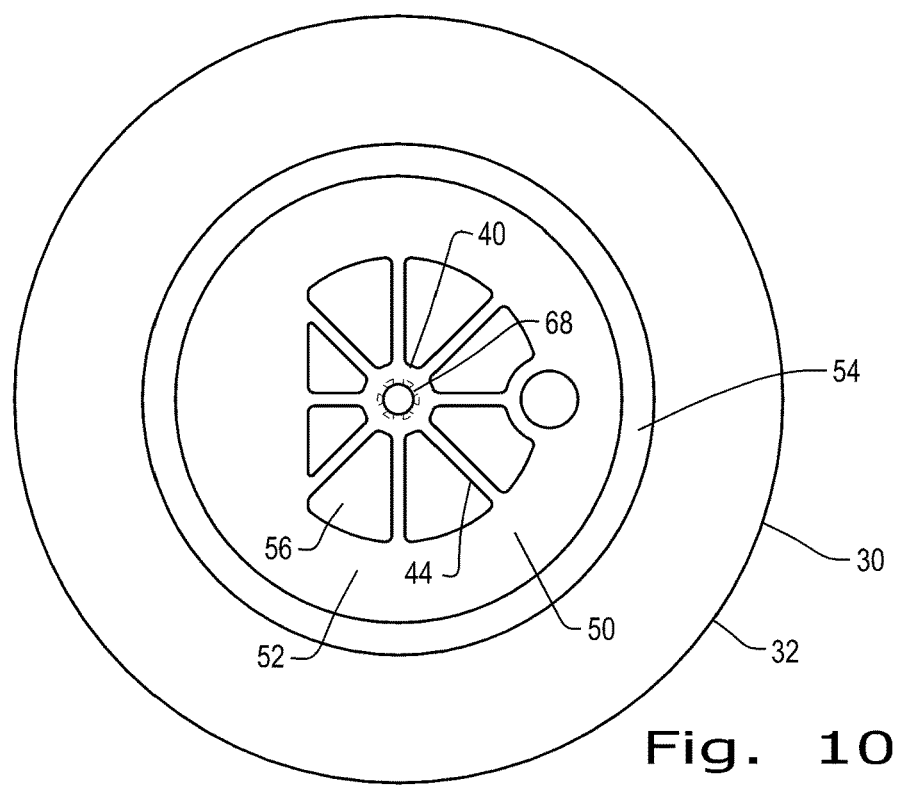
FIG. 10 is a top view of a molded piston of an air spring according to an embodiment of the present invention.
Figure 11:
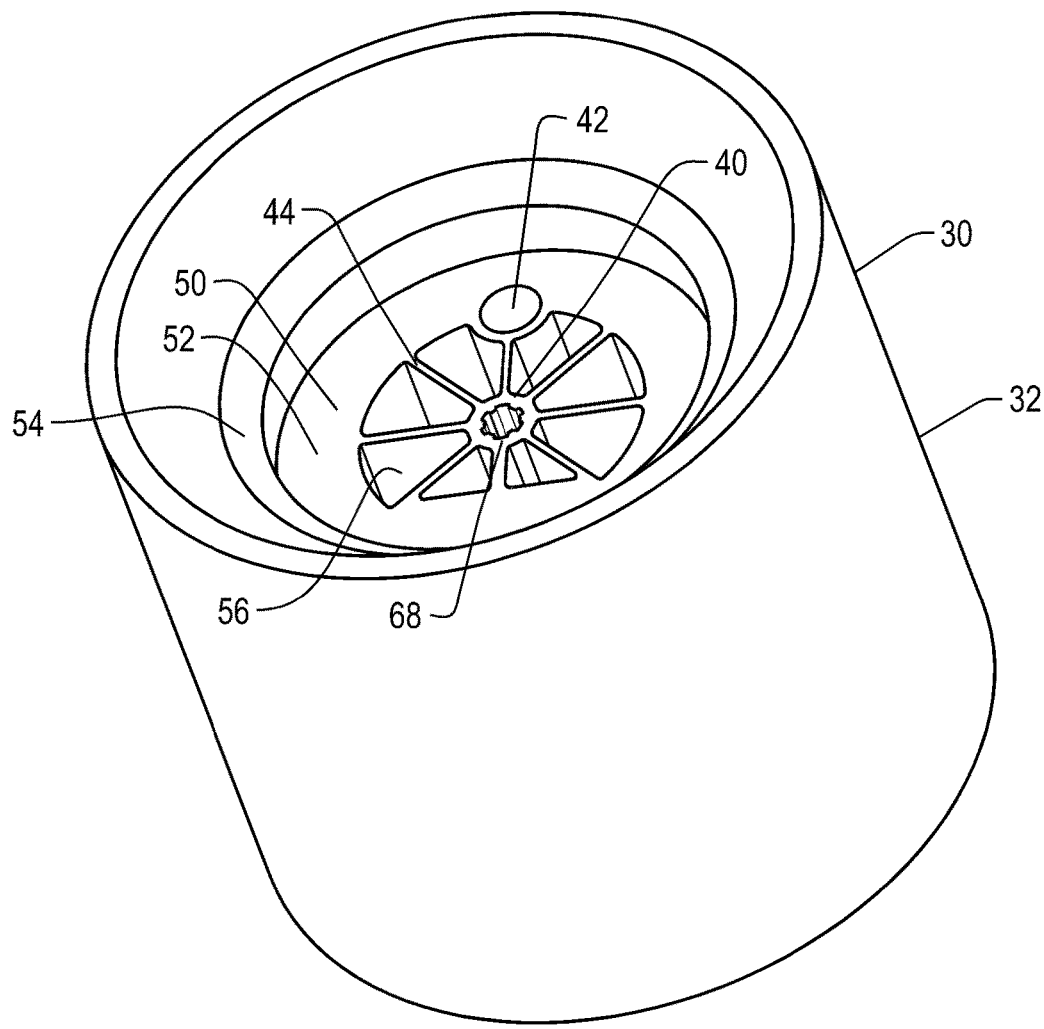
FIG. 11 is an isometric view of a molded piston of an air spring according to an embodiment of the present invention.
Figure 13:
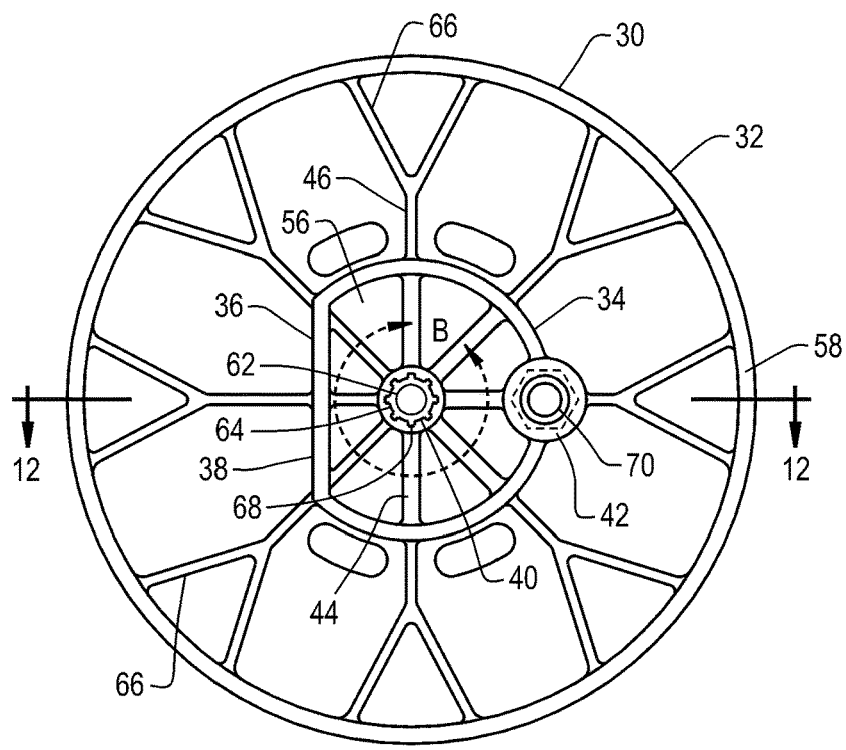
FIG. 13 is a bottom view of a molded piston of an air spring according to an embodiment of the present invention.

FIG. 13 shows a bottom view of the molded piston shown in FIG. 12, similar to FIG. 8. The molded piston 30 is again possessed of an outer shell portion 32, a central column 34, inner radial webs 44, outer radial webs 46, Y-shaped webs 66, and lower surface 58. A non-cylindrical portion 36 of central column 34 again takes the form of a chordal surface 38. The central column 34 again possesses a mounting stud sleeve and hole 40 and a locating sleeve and hole 42. The mounting stud sleeve and hole 40 is again provided with a spline 68, which may be used to provide positive location to the mounting stud (not shown), while allowing for sufficient draft to remove the tooling used to form the molded piston 30, as will be shown. The mounting sleeve and hole 40 again may or may not be provided with a central thread 62, which may take the form of a threaded insert 64. The threaded insert 64 may interface with the mounting sleeve and hole 40 by way of the spline 68, or may otherwise be molded into the molded piston 30. The locating sleeve and hole 42 is similarly provided with a molded-in threaded insert 70. The interior of the central column 34, the exterior of the mounting stud sleeve and hole 40, and the inner radial webs 44 again define chambers which extend from the lower surface 58 to openings 56 in the recessed lower end closure seating surface 52 (not shown).

Figure 14:
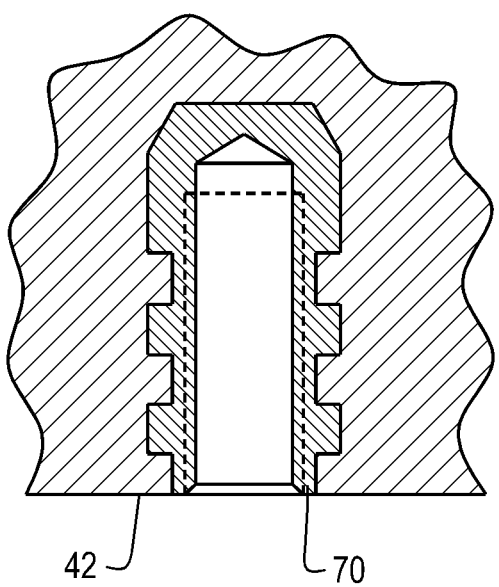
FIG. 14 is a cross-section detail view of a threaded insert of a molded piston of an air spring according to an embodiment of the present invention.
Figure 15:
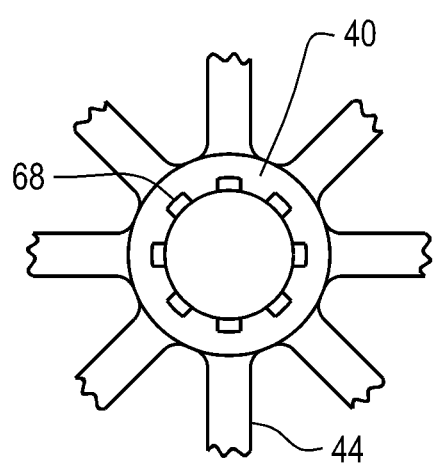
FIG. 15 is another detail view of a threaded insert of a molded piston of an air spring according to an embodiment of the present invention.
Figure 16:
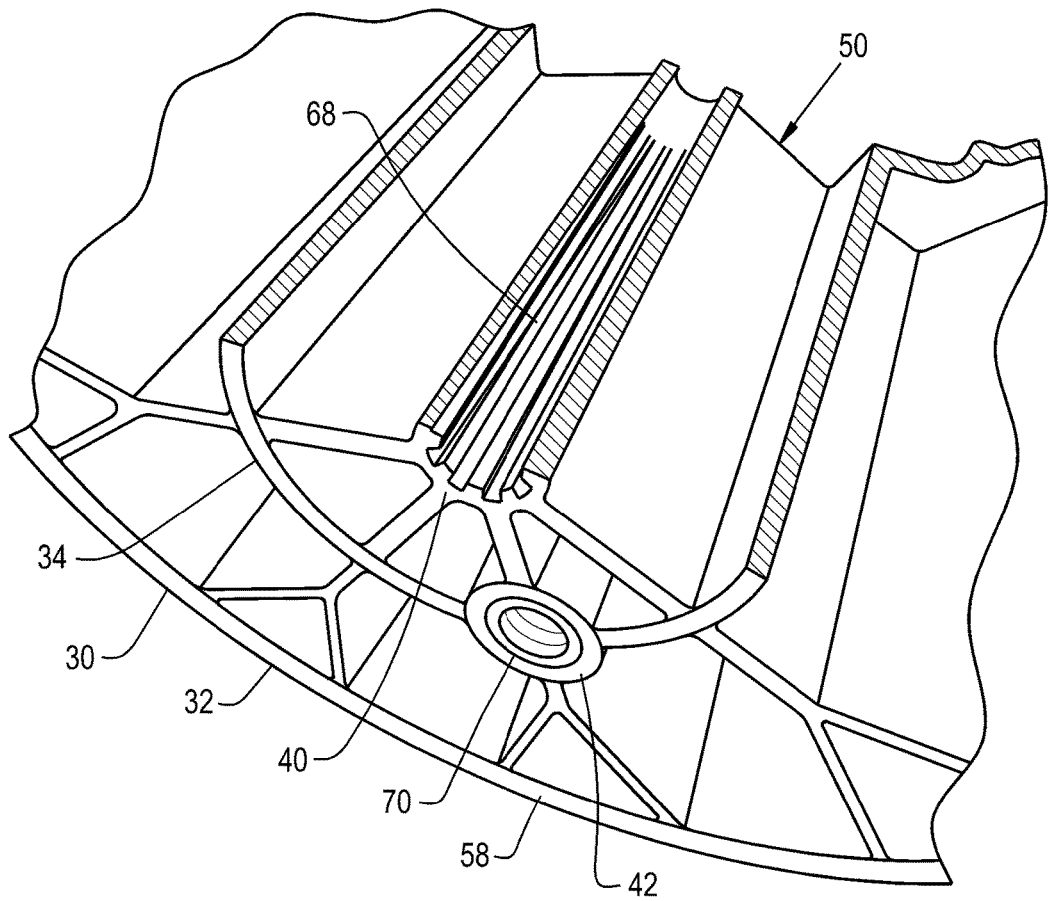
FIG. 16 is an isometric cross-sectional view of a molded piston of an air spring according to another embodiment of the present invention.

FIG. 14 shows further detail of the molded-in threaded insert 70, as molded into the locating sleeve and hole 42. FIG. 15 similarly shows further detail of the mounting stud sleeve and hole 40 in the embodiment having a spline 68. The isometric cross-sectional view of the molded piston 30 shown in FIG. 16 shows particular detail of the spline 68 of the mounting stud sleeve and hole 40. In particular, the spline 68 is formed such that its inner diameter is constant along the length of the hole 40, while the outer diameter of the spline tapers inwards along its length towards the upper surface 50. In this way, the inner diameter of the spline 68 provides positive location of the mounting stud (not shown) along its full length, while the inwardly tapering outer diameter of the spline allows for sufficient overall draft to remove the tooling used to form the molded piston 30.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An air spring for a vehicle, comprising:
   a top bead plate;
   a flexible sleeve;
   a lower end closure; and
   a molded piston having an outer shell, a non-cylindrical central column configured for providing lateral stiffness and strength to the outer shell by being braced in its relation to said outer shell by outer radial webs, and an upper surface, said non-cylindrical central column further includes a mounting stud sleeve and hole braced in its relation to said non-cylindrical central column by inner radial webs, said mounting stud sleeve and hole includes a spline within said mounting stud sleeve and hole having an inner diameter that remains constant along its length, and having an outer diameter that tapers inward along its length.

2. The air spring of claim 1, wherein:
   said non-cylindrical central column further includes a chordal surface.

3. The air spring of claim 1, wherein:
   said upper surface further includes a recessed lower end closure seating surface, a seating surface mounting bead recess, and lower end closure seating surface openings.

4. The air spring of claim 1, wherein:
   said mounting stud sleeve and hole includes at least one threaded insert.

5. The air spring of claim 1, wherein:
   said outer radial webs are provided with Y-shaped webs connecting said outer radial webs to said outer shell.

6. The air spring of claim 5, wherein:
   said Y-shaped webs describing one of an orthogonal angle and an acute angle.

7. The air spring of claim 1, wherein:
   said non-cylindrical central column further includes a locating sleeve and hole.

8. The air spring of claim 7, wherein:
   said locating sleeve and hole being further provided with a molded-in threaded insert.

9. The air spring of claim 1, wherein:
   said outer radial webs being provided with web arches.

10. A molded piston for an air spring for a vehicle, comprising:
    an outer shell, a non-cylindrical central column configured for providing lateral stiffness and strength to the outer shell by being braced in its relation to said outer shell by outer radial webs, and an upper surface having a recessed lower end closure seating surface, said non-cylindrical central column further includes a mounting stud sleeve and hole braced in its relation to said non-cylindrical central column by inner radial webs, said mounting stud sleeve and hole includes a spline within said mounting stud sleeve and hole having an inner diameter that remains constant along its length, and having an outer diameter that tapers inward along its length.

11. The molded piston of claim 10, wherein:
    said non-cylindrical central column further includes a chordal surface.

12. The molded piston of claim 10, wherein:
    said outer radial webs are provided with Y-shaped webs connecting said outer radial webs to said outer shell.

13. The molded piston of claim 12, wherein:
    said Y-shaped webs describing one of an orthogonal angle and an acute angle.

14. The molded piston of claim 10, wherein:
    said non-cylindrical central column further includes a locating sleeve and hole.

15. The molded piston of claim 14, wherein:
    said locating sleeve and hole being further provided with a molded-in threaded insert.

16. The molded piston of claim 10, wherein:
    said outer radial webs being provided with web arches.

* * * * *